United States Patent Office 3,705,224
Patented Dec. 5, 1972

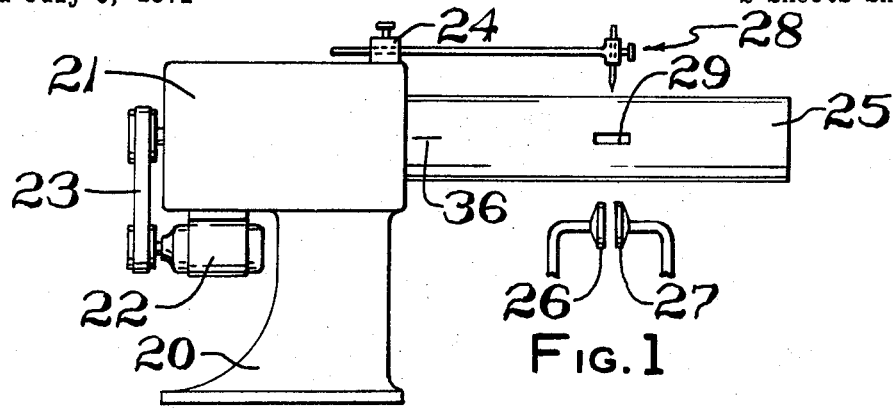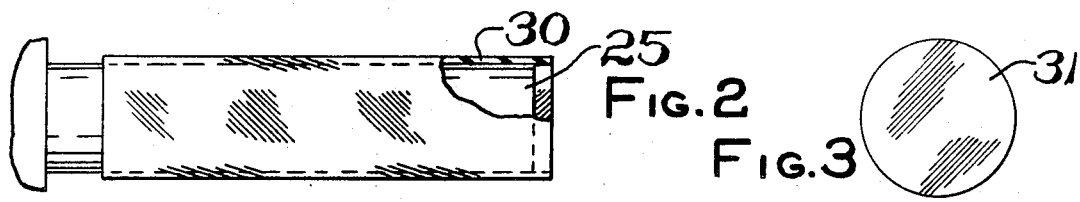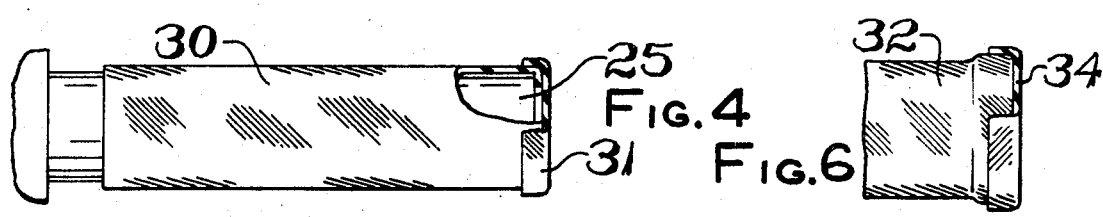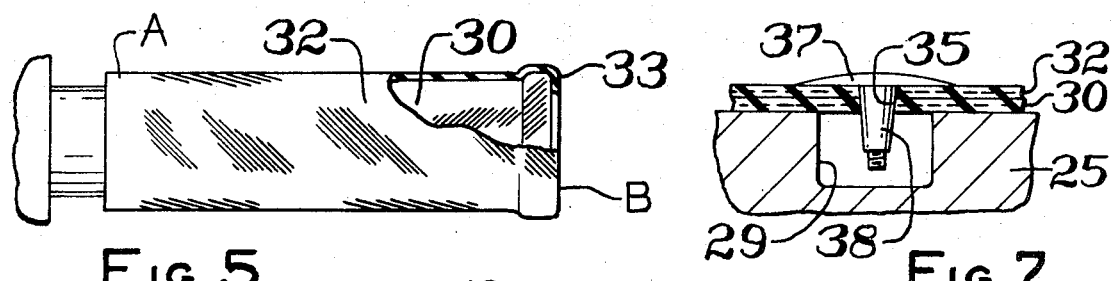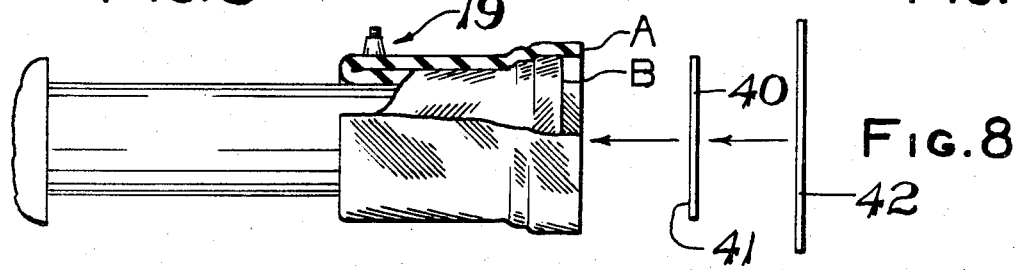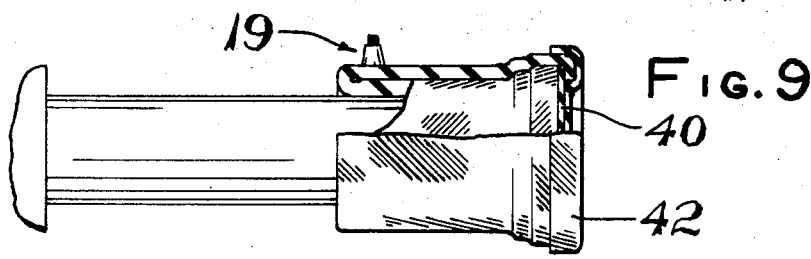

3,705,224
METHOD OF MAKING A JACK
Harry F. Neff, Medina, and Stephen C. Sabo, Barberton, Ohio, assignors to The B. F. Goodrich Company, New York, N.Y.
Filed July 6, 1971, Ser. No. 159,945
Int. Cl. B29c 17/07; B29h 7/03
U.S. Cl. 264—96                                     7 Claims

ABSTRACT OF THE DISCLOSURE

A method for making an inflatable pneumatic bag jack made in the form of a cylindrical bag of impervious flexible material of a diameter several times its axial collapsed length wherein annular corrugations are in the flat end faces immediately inside the periphery.

BACKGROUND OF THE INVENTION

Pneumatic bag jacks have been known and used for many years, however, their use has been limited to special situations. A further restriction on their development has been the difficulty in molding them into practical storage units, such that upon deflation they assume a manageable small unit having sufficient corrugation that lends itself to portability and handling. A further difficulty is to provide a process that facilitates the making of these units economically and easily.

SUMMARY OF THE INVENTION

The present invention contemplates a novel method of fabricating an inflatable jack economically yet provides a sturdy unit that upon inflation is able to structurally support a sizeable load disproportionate to its weight, such as a compact inflatable light-weight jack for use in lifting automobiles. Particularly significant is the compactness in that the folds are nested and in overlapping relationship and wherein the jack is built with its interior surface on the outside and thence reversed inside-out for the final forming and vulcanization.

BRIEF DESCRIPTION OF THE DRAWINGS

FIG. 1 is a side elevational view of a jack building apparatus with stitchers shown schematically.

FIG. 2 is a side elevational view of the first step of the process of building a jack showing a fabric ply encircling the drum.

FIG. 3 is an end view of an end cap.

FIG. 4 is a side elevational view of the mandrel with fabric ply thereon with a portion of the ply, mandrel and end cap broken away.

FIG. 5 is a side elevational view of the mandrel with a second fabric ply located thereon with a portion broken away disclosing in cross-section the first end cap and the second ply fabric.

FIG. 6 is a fragmentary portion of the outboard end of the mandrel showing the second ply and a second cap thereon with a portion broken away disclosing the second end cap in cross section.

FIG. 7 is a fragmentary enlarged view of the mandrel disclosing a pair of ply fabrics with a valve stem extending therethrough into the bore located in the mandrel.

FIG. 8 is a side elevation view of the mandrel showing the inboard portion of the jack body pulled out over the outboard end portion thereof with a pair of end caps that are to be placed thereon.

FIG. 9 is a fragmentary side elevation view of the mandrel with the respective end caps placed on the jack body with portions thereof broken away.

DETAILED DESCRIPTION

Figure 11:
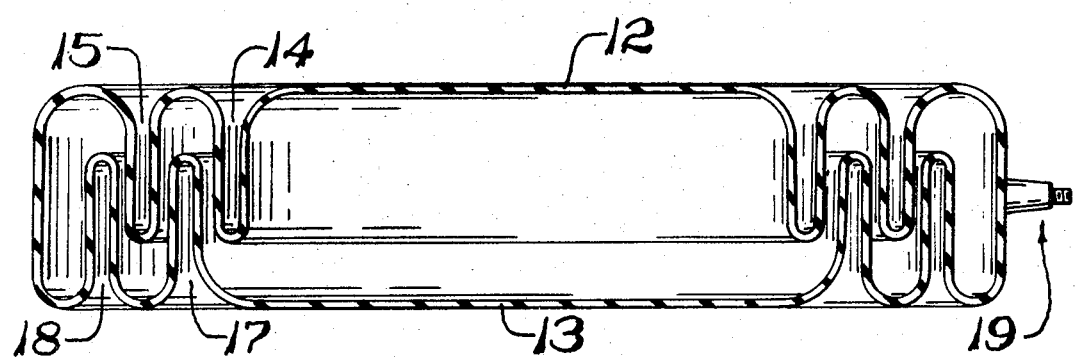
FIG. 11 is a cross sectional view of the jack body.
Figure 13:
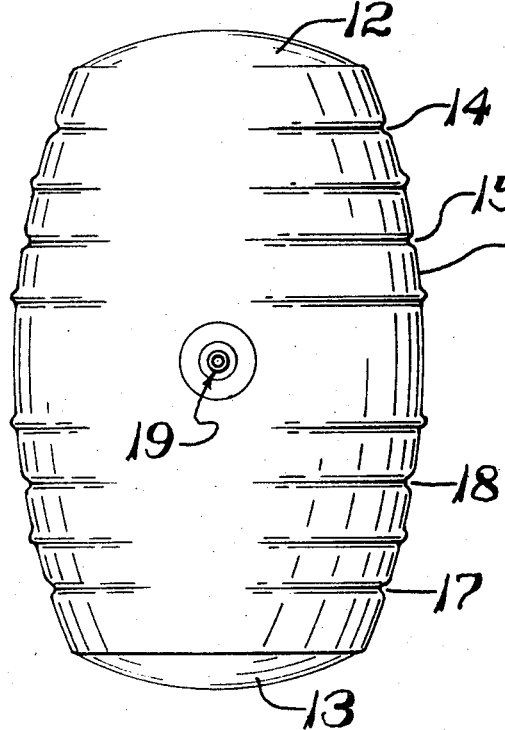
FIG. 13 is a view showing the appearance and shape of the jack when fully inflated.
Figure 12:
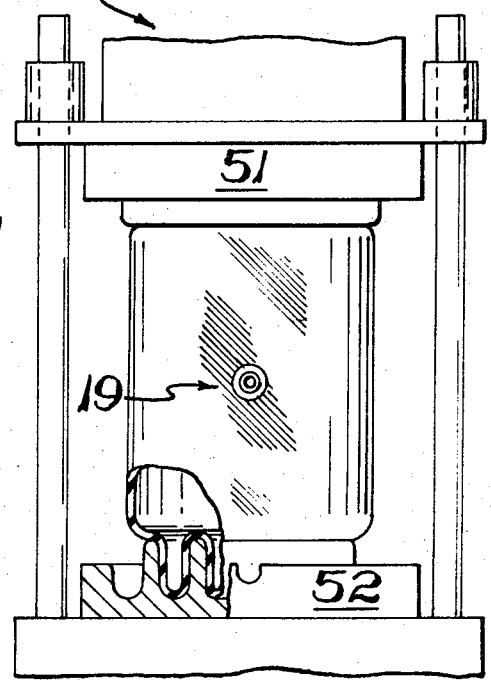
FIG. 12 is a schematic showing of a press in an open position with the jack body placed between the respective mold faces prior to closing of the mold with a portion of the mold and jack body broken away to show those portions in cross section.

A jack is shown in FIGS. 11 and 13 wherein the jack has an outer surface 11 with a diameter 3 to 4 times the axial length of the jack in the uninflated condition. The upper and lower ends 12 and 13 respectively are closed and substantially flat. Upon deflation, the jack assumes the form shown in FIG. 11. The upper portion of the jack has a pair of annular corrugations 14 and 15 while the lower portion of the jack has a pair of annular corrugations 17 and 18, such that the respective corrugations are nested together to form a compact device. A conventional inflating valve 19 is provided preferably in the side of the cylindrical surface 11 for the purpose of inflating and deflating the jack.

An apparatus for aiding the making of such inflatable jack is shown in FIG. 1, which apparatus comprises a base 20 which supports transmission means 21 to which is mounted a motor 22. The output of motor 22 is connected to the input of the transmission means 21 via a belt 23. The output of transmission means 21 drives a cantilever supported mandrel or drum 25. Other conventional means may be employed to rotate the mandrel 25 in manners well-known in the art. Disclosed schematically in FIG. 1 are stitching wheels 26, 27 which are adapted to engage the body of the mandrel and move axially in opposite directions to stitch ply fabric as located on such mandrel. If desired, manual stitching wheels may be employed to perform the stitching operations hereinafter referred to. Located on the housing of the transmission 21 is a bracket 24 which supports a marking device 28 which is adapted to locate a slot 29 on mandrel 25. Slot 29 is located in the middle of the mandrel 25 and adapted to accept inflation valve 19 at approximately the middle of the jack body to be constructed. The construction of the jack to be described may be accomplished on the above described apparatus or with the use of a tire building machine equipped with power stitchers. The mandrel employed to construct the jack to be described may be approximately 33 inches long and approximately 8 inches in diameter. A first ply 30 of bias cut rubberized fabric or stock is placed onto the mandrel and wound thereonaround so that the respective ends can be joined together by overlapping the ends. The overlap is spliced to form a cylindrical one-piece unit as depicted by FIG. 2. The rubberized fabric is approximately 0.055 inch thick having its cords at a 56° bias angle. As a practical matter, the ply stock is placed onto the mandrel and motor 22 is energized to provide an input to transmission means 21 which rotates mandrel 25. This action will wind the ply stock onto the mandrel 25 until motor 22 is de-energized. Upon rotating mandrel 25 a complete revolution, mandrel 25 will facilitate the formation of a one piece cylindrical ply of material. The ply stock material may be fed from a continuous roll of material or from individual trays. Such stock rolls or trays may be located directly behind the building mandrel with an edge guide to assist and guide the ply run-on. To join the respective edges of the ply stock, the edges may be butt spliced or lap spliced in a manner old and well-known in the art.

The first ply 30 as positioned onto the mandrel has its outboard end overhanging the end of the mandrel. The overhanging portion of the ply stock is then turned down over the outboard end of the mandrel as by stitchers. The operator then applies a first cap 31 (FIG. 3) which is made from rubber coated fabric, to the turned down outboard end portion of the first ply 30. The cap is shown diagrammatically in FIG. 3. The end cap is turned up and over the end portion of the first ply forming an integral unit as depicted by FIG. 4. The thickness of the fabric as shown in FIG. 5 (as well as the other figures) is out of proportion in order to illustrate the relationship of the end cap with respect to the first ply. A second ply 32 of bias cut fabric calendered to approximately 0.055 inch thickness is applied and positioned onto the mandrel onto first ply 30 and wound thereon with the respective edge portions spliced together to form a cylindrical one-piece unit that is co-extensive with the first ply 30. The bias angle of the second ply 32 is in a direction opposite to the first ply 30. The mandrel is rotated and the power stitchers 26 and 27 are then actuated and moved into contact with the ply stock 32, and stitched so that the second ply 32 is firmly stitched to the first ply 30 to remove trapped air between the plies. A hand stitcher may also be used to perform the end stitching at the outboard end. However, power stitchers equipped with suitable control means may effect the stitching. The outboard end of the second ply 32 during such stitching operation is turned down and over the first end cap 31 as depicted in FIG. 5. A second end cap 34 substantially a cylindrical disk made of reinforced fabric material is then placed on the outboard end of the mandrel and has its outer edges turned up over the outboard end portion of the mandrel ply stock as depicted by FIG. 6. Thereafter a suitable hand tool pierces a hole 35 substantially in line with the middle portion of the mandrel such as to register with the slot 29. This may be facilitated by marking such as indicia 36 on the inboard end portion of the mandrel 25 along with a movable marking unit 28, wherein indicia 36 registers with the slot 29 and the marking unit 28 indicates on the fabric ply where to pierce the hole. The inflating valve 19 includes a base 37 having a ply molded over the base so that upon positioning of valve 19 into the bore 35, the base 37 lies flat against the ply stock and the stem 38 of inflating valve 19 extending into slot 29. The outer bond thereto. The outside surface of the jack body is then dusted with a talc or powdered polyethylene. The powdered polyethylene is used to prevent sticking between the end caps that are to be applied to the jack body as hereinafter described, and to facilitate the sliding of the inboard portion of the jack body over and towards the outboard portion.

Figure 10:
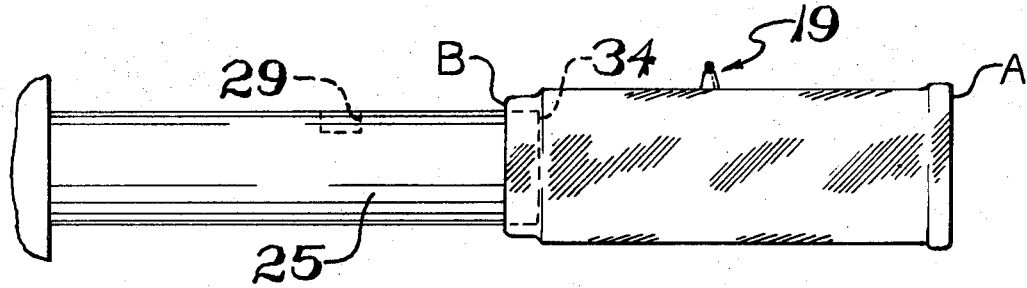
FIG. 10 is a side elevation view of the mandrel with the jack body substantially inflated and removed from the mandrel.

The operator then moves the inboard portion of the jack body which in FIG. 5 is indicated as A towards the outboard end B until the inboard end A is brought back over and overhangs the outboard end by approximately 1 inch as depicted in FIG. 8. A gauge may be used to assure a proper overhanging for the operation to maintain proper clearance and assures that sufficient material is overhanging to permit stitching. A third end cap 40 disclosed in FIG. 8 has its one end surface 41 dusted with polyethylene powder which powdered end portion is moved into abutting engagement with the outboard end B of the jack body as shown in FIG. 9. The cap 40 is positioned such that the overhanging end portion A of the jack body can be stitched down and around to the outside surface of the cap 40. The overhanging portion A is then stitched to the end cap 40 after which a fourth end cap 42 composed of crossed plies is positioned onto the outboard end of the jack body under construction on the mandrel to abuttingly engage the outside surface of the third disk 40 such that a turning up operation on the disk 42 firmly engages the inboard portion A of the jack body. The jack body is then removed from the mandrel by applying an air line to the valve 19 of the jack and inflating the interior of the jack to a low pressure which blows off the jack from the building mandrel 25 as depicted in FIG. 10. The pressure on the interior of the inboard portion of the jack body moves the jack body off the drum. The cylindrical inverted jack body is then placed in a curing press 50, which press 50 has a pair of spaced mold sections 51 and 52. Respective mold sections 50 and 51 have complementary annular corrugations which mold the annular folds 14, 15, 17 and 18 into the jack body as the mold sections 51 and 52 are moved into relative abutting engagement. Suitable heating means such as steam is passed through the mold sections to cure or vulcanize the jack into its final form which is shown in FIG. 11. The vulcanization of such air bag or jack is a forming as well as a curing operation.

It will be apparent that although a specific embodiment of the invention has been described in detail, the invention is not limited to the specifically illustrated and described process since variations may be made without departing from the teachings of the invention.

We claim:

1. The method of making an inflatable jack comprising the steps of forming an elongated cylindrically shaped body of impervious elastomeric material that is closed on one side end and open on the other end, securing a valve to said body with the stem portion extending into said body, dusting the entire outer surface of the cylindrical body with powdered talc, folding the open end portion over the closed end portion, dusting with powdered talc the one side of a circular end cap, applying said powdered end cap into abutting contact with the closed end of said cylindrical body, stitching said open end portion into intimate contact with said undusted portion of said end cap to form a closed container, inflating the interior of said closed container to invert said cylindrically shaped body inside out, shaping said elongated body into a flat form having annular corrugations in the flat upper and lower portions of the jack immediately inside the periphery to provide a diameter that is greater than the axial length of said flat form, and vulcanizing said flat form to form a jack.

2. The method of making an inflatable jack as set forth in claim 1 wherein said forming of said cylindrically shaped body includes the using of at least a pair of plies in overlapping relationship having their respective strands in criss-crossing relationship.

3. The method of making an inflatable jack comprising the steps of forming a cylindrical body from rubberized fabric material having a closed outboard end and an open inboard end, mounting a valve means into the cylindrical body with the inlet portion thereof facing the interior of said body, dusting the exterior surface of the said cylindrical body to prevent sticking thereof, folding over the inboard end over the outboard portion to extend slightly said inboard portion beyond the outboard portion securing an end cap means to said inboard end portion to provide a closed container, inflating said closed container to invert said cylindrical body inside out, curing said cylindrical body into a flat cylindrical form having an upper and lower surface with an intermediate cylindrical portion with annular corrugations in the upper and lower surfaces.

4. The method of making an inflatable jack comprising the steps of forming a cylindrically shaped body of impervious flexible material closed at one end and open at the other end, securing a valve to said body with the inlet of said valve communicating with the interior of said body, applying an adhesion reducing material to the outer surface of the cylindrical body, folding the open end portion of the body outwardly and concentrically with the remainder of the body and with the said open end extending over the closed end portion, applying an impervious end cap into abutting contact with the closed end of said cylindrical body and with an adhesion reducing material between adjacent surfaces of said end cap and said closed end, sealingly engaging said open end portion with said end cap to form a closed container, applying inflating media through said valve into the interior of said closed container to thereby complete the inversion of the said cylindrical shaped body with respect to its initial form, and vulcanizing said body.

5. The method as defined in claim 1 wherein the said cylindrically shaped body has a diameter less than its length and said body is vulcanized by introducing it into a cylindrical mold of greater diameter than length and having a plurality of concentric axially extending annular recesses into which portions of said cylindrical body are disposed, and the said mold with the said body disposed therein is thereafter subjected to heat and pressure whereby the completely vulcanized body is molded to a cylindrical configuration with the outer diameter thereof greater than that of the diameter of the said end portions and with axially facing annular corrugations formed radially outwardly from said end portions and concentric therewith.

6. The method as defined in claim 2 wherein said body is so molded that the annular corrugations on one end face interfit with those on the other end face.

7. The method of making an inflatable jack, comprising the steps of plying onto a drum a first ply of bias cut rubberized fabric to form an elongated cylindrical body having an outboard edge of ply stock overlapping the mandrel, turning down the overhanging portion of said ply stock, applying an end cap onto said turned down portion of said ply stock, turning the outer end portions of said cap onto the outboard end portion of said ply stock, securing a second ply of bias cut rubberized fabric onto said first ply with the bias cut fabric thereof crisscrossing the fabric material of said first ply, turning down the outboard end portion of said second ply, securing a second end cap to the outboard end portion of said second ply and turning up the outer end periphery of said end cap into abutting engagement with said second ply, making a bore on the middle portion of said cylindrical body, mounting an inflating valve into said bore with the inlet stem portion thereof extending inwardly into the interior of said body, dusting the exterior surface of said cylindrical body and said end caps, moving the inboard portion of said cylindrical body towards the outboard portion to provide an overhanging portion, dusting one side surface of a third end cap, placing said third end cap with said dusted surface into contact with said second cap, stitching said overhanging portion to the other side surface of said third end cap, stitching a fourth end cap to said third end cap, pressurizing the interior of said body through said inlet portion of said valve to turn said cylindrical body inside out, shaping said cylindrical body into a flat form having annular corrugations in the flat upper and lower portions of the jack immediately inside the outer peripheral annular edge of said flat form to provide a diameter that is greater than the axial length of said flat form, and vulcanizing said flat form with annular corrugations therein.

References Cited

UNITED STATES PATENTS

| 3,321,346 | 5/1967 | Powell | 264—94 X |
| 2,373,529 | 4/1945 | Beal | 264—130 X |
| 3,408,439 | 10/1968 | Prohaska | 264—294 |
| 2,041,357 | 5/1936 | Kraft | 264—94 X |
| 3,004,579 | 10/1961 | Hutch | 264—94 X |

FOREIGN PATENTS

| 648,998 | 1948 | Great Britain | 264—94 |
| 593,950 | 1960 | Canada | 264—94 |

ROBERT F. WHITE, Primary Examiner

R. R. KUCIA, Assistant Examiner

U.S. Cl. X.R.

264—94, 130, 294, 296

UNITED STATES PATENT OFFICE
CERTIFICATE OF CORRECTION

Patent No. 3,705,224    Dated December 5, 1972

Inventor(s) Harry F. Neff and Stephen C. Sabo

It is certified that error appears in the above-identified patent and that said Letters Patent are hereby corrected as shown below:

Column 3, line 28, after "end" add ---33---

Column 3, line 46, after "outer" add ---periphery of the base 37 of the inflating valve 19 is stitched to the ply stock 32 to form a---

Signed and sealed this 29th day of May 1973.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,705,224      Dated December 5, 1972

Inventor(s) Harry F. Neff and Stephen C. Sabo

It is certified that error appears in the above-identified patent and that said Letters Patent are hereby corrected as shown below:

Column 3, line 28, after "end" add ---33---

Signed and Sealed this

*eighteenth* Day of *November 1975*

[SEAL]

Attest:

RUTH C. MASON
*Attesting Officer*

C. MARSHALL DANN
*Commissioner of Patents and Trademarks*